Figure 1:
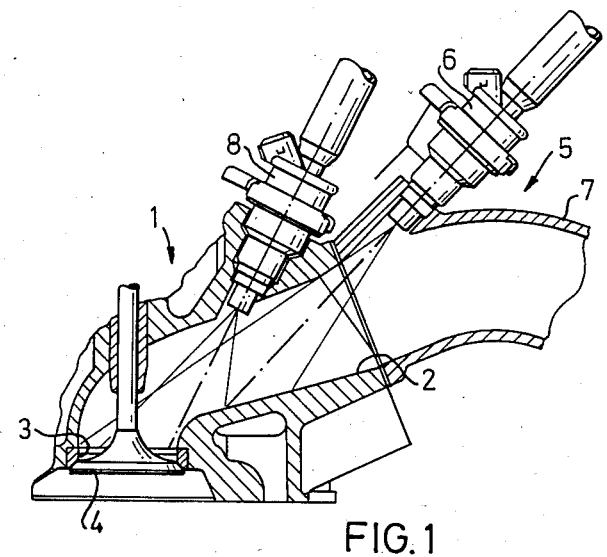

United States Patent [19]

Sandberg et al.

[11] Patent Number: 4,558,665
[45] Date of Patent: Dec. 17, 1985

[54] TURBO CHARGED COMBUSTION ENGINE WITH WATER INJECTION

[75] Inventors: Lars Sandberg, Gothenburg; Björn Scheuer, Horred, both of Sweden

[73] Assignee: AB Volvo, Gothenburg, Sweden

[21] Appl. No.: 645,526

[22] Filed: Aug. 29, 1984

[30] Foreign Application Priority Data

Sep. 9, 1983 [SE] Sweden .................. 83048447

[51] Int. Cl.⁴ .......................................... F02M 25/02
[52] U.S. Cl. ........................... 123/25 C; 123/25 A; 123/25 J; 123/25 M; 123/25 N
[58] Field of Search ............... 123/25 C, 25 D, 25 A, 123/25 R, 25 J, 25 M, 25 N, 198 A; 60/605

[56] References Cited

U.S. PATENT DOCUMENTS

| | | | |
|---|---|---|---|
| 3,672,341 | 6/1972 | Smith et al. | 123/25 C |
| 3,845,745 | 11/1974 | Dunlap et al. | 123/25 J |
| 4,018,192 | 4/1977 | Eft | 123/25 C |
| 4,120,268 | 10/1978 | Bastenhof | 123/25 C |
| 4,290,392 | 9/1981 | Dissmore | 123/25 C |
| 4,322,950 | 4/1982 | Jepsen | 123/25 D |
| 4,406,255 | 9/1983 | Goodman | 123/25 A |
| 4,502,420 | 3/1985 | Mezger | 123/25 C |

FOREIGN PATENT DOCUMENTS

WO83/01486  4/1983  PCT Int'l Appl. .

Primary Examiner—Ira S. Lazarus
Attorney, Agent, or Firm—Young & Thompson

[57] ABSTRACT

The invention relates to a turbo charged combustion engine with water injection. The characterizing feature of the engine is that there is provided one water injector for each cylinder, each respective injector facing the inlet port for injecting at least the main portion of the water jet straight into the inlet port.

7 Claims, 2 Drawing Figures

TURBO CHARGED COMBUSTION ENGINE WITH WATER INJECTION

The present invention relates to a turbo charged combustion engine comprising means for the supply of water to the combustion chamber of the engine.

The method of supplying water to the combustion chambers in combustion engines has been known for a long time and is intended for lowering the exhaust gas temperature and overcoming the tendency to knocking primarily in turbo charged engines in order to accomplish in this way a higher charge pressure and a higher power output than would otherwise be possible.

For the sake of obtaining the highest possible power output from the engine, it is essential to prevent the water from vaporizing before its entrance into the combustion chamber, since the water vapor would otherwise steal space from the combustion air thus reducing the volumetric efficiency with the loss of power as a result thereof. Furthermore, it is important for the engine to receive the proper amount of fuel and water at maximum load. The supply of incorrect quantities of fuel or water will result in a reduced power output, or would involve the risk of engine breakdown.

It is however desirable not only at maximum load but under all operating conditions that the engine can be supplied with the appropriate quantity of water, and that this is made possible by controlling the so-called prestoring time, i.e. the period from starting the injection until the inlet valve begins to open.

So far, there are known three different methods of distributing water to the combustion chamber of a combustion engine, which all have their limitations with regard to fulfilling the conditions mentioned above. One method relates to the injection of water on the suction side of the turbo compressor, a second method relates to the injection on the compression side of the compressor in front of the engine inlet manifold, whereas a third method deals with the admixture of water in the fuel and injection via the fuel injectors. With the first two methods, the occurrence of a certain degree of vaporization outside the combustion chambers cannot be avoided. Moreover, control of the prestorage is impossible. With the third method, the fuel dosage is disturbed and it is difficult to regulate the quantity of water supplied at various loads. With regard to prestorage, the supply of water is tied to the fuel injection in this case.

In all known methods, the charge pressure is utilized as the sole controlling parameter for the dosage of water; in the first method by the charge pressure pressing water directly from a tank to the compressor, and in the two other methods by the charge pressure controlling a water pump which pumps water from a tank either to the pipe between the compressor and the inlet manifold, or to the fuel feed line. Fuel injection normally starts when the charge pressure rises above a predetermined level, and continues until the pressure drops below this level. The dosage of water is thereby adapted so that the desired water cooling effect is obtained at maximum engine power with the consequence however that the engine will receive too much water at lower loads or engine speeds, resulting in poor road behavior. This in turn means that the known methods for water injection will not suit other purposes than those exclusively related to racing.

The purpose of the present invention is to achieve a combustion engine of the kind mentioned in the introduction making possible the supply of water without disturbing or being dependent on the fuel system, and without water evaporation taking place outside the combustion chambers, and also enabling an accurate dosage of water under all driving conditions.

This is accomplished according to the invention by the means for supply of water being formed of separate injection means for each one of the cylinders, said means being directed towards the inlet port of each respective cylinder.

The arrangement of providing one water injection valve for each cylinder creates the necessary requirements for an extremely accurate dosage of water which can be adapted to all operating conditions. The use of a control unit for regulation of the injection valves and a number of signal emitters connected to the engine for sending input signals to the control unit representing crankshaft position, engine speed and load as well as inlet gas temperature if required, will enable sequential injection and synchronization with the opening and closing of the inlet valves as well as the dosage on water not only in dependence on the load but also on the r.p.m and intake air temperature, which allows for good road behavior under all driving conditions.

Figure 2:
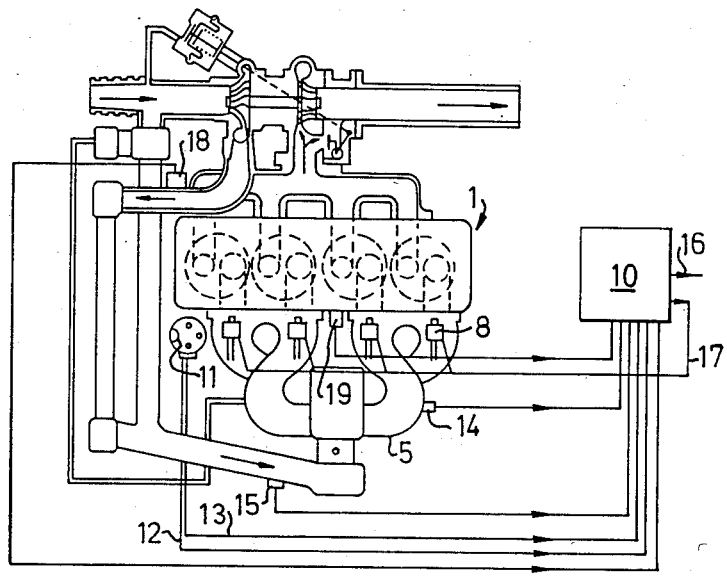

The invention will be described in more detail while referring to the exemplary embodiment illustrated in the accompanying drawing, where FIG. 1 shows a cross section of part of a cylinder head with a connecting inlet pipe, and FIG. 2 shows a principle diagram of a water injection system.

In FIG. 1, reference numeral 1 designates a cylinder head with an inlet duct 2, an inlet port 3 and a valve 4. An inlet manifold 5 is connected to the cylinder head 1 and is provided with a fuel injector 6 disposed in either one of the inlet pipes 7 which open into the inlet ducts 2. A water injector 8 for each cylinder is mounted in the cylinder head 1. The water injector can be of the same type as the fuel injector and is, as illustrated in FIG. 1, situated closer to the inlet port 3 than is the fuel injector 6 and directed so that its axis lies within the periphery of the inlet port, whereby the main portion of the water is injected directly into the combustion chamber.

The water injection valves 8 are regulated by an electronic control unit 10 (FIG. 2) which calculates, by the guidance of input signals representing crankshaft position, load and r.p.m., the time for initiating the injection and the amount of water to be injected at each engine speed and load.

The crankshaft position must be defined in order to determine the injection sequence between the cylinders and to synchronize the injection with the instant of opening and closing the inlet valves, and is received from a sensor coordinated with the ignition system distributor 11, said sensor being represented by the line 12 shown in FIG. 2. The engine speed as well can be obtained from a sensor coordinated with said distributor and represented by the line 13. Alternatively, the values for r.p.m. and position can be obtained from a flywheel sensor. The value for load is received from a pressure sensor 14 on the inlet manifold. Reference numeral 16 designates a line going to a water pump (not shown), and reference numeral 17 designates a line going from the control unit 10 to the water injection valves 8.

The water injection system is part of a simplified CCT (Computer Controlled Turbo) system of the kind described in Swedish Patent Application No. 8101119-9 which includes, in addition to the sensors mentioned above, a charge pressure sensor 18 and a knock sensor 19. The control unit 10 comprises a microprocessor which is utilized here for regulating the injection of water, the values for moment of injection and quantity of water as functions of load and r.p.m. being stored in the microprocessor. In this connection it is also possible to let the signal from the knock sensor 19 and the signal from an inlet gas temperature sensor 20 regulate the quantity of water.

The combination of one water injector per cylinder, sequential injection and electronic control of the quantity of water creates an injection system which is considerably more advantageous than any conventional system known so far with regard to its adjustability to all operating conditions of an engine.

In tests performed with an automobile provided with the inventive engine, the automobile was driven during one of the testing sequences at constant speed and at constant inlet pipe pressure, whereby the tensile force and the exhaust gas temperature were recorded. The engine was first run with a fuel mixture of "normal" CO content. The fuel/air mixture was then made leaner until the appearance of sharp knocks, whereafter the water injection was started and adjusted so that the knocks disappeared and the exhaust gas temperature dropped to the original level. It was then found that as much as 20% of the fuel had been replaced by water without any alteration of the exhaust gas temperature or power output. It was further established that it would be possible to get a higher power output out of the engine by cooling with the aid of water injection than by cooling with the aid of extra enrichment of the mixture.

What we claim is:

1. Turbo charged combustion engine comprising a plurality of cylinders, each cylinder having an inlet valve that opens to admit a combustible mixture to the associated cylinder, means to supply a said combustible mixture to each said inlet valve, means to supply water to said cylinders, said water supply means comprising a separate water injection valve for each cylinder, said valves being directed toward the inlet valve of each cylinder, and a control unit for sequentially operating the water injection valves in synchronism with the opening and closing of the inlet valves.

2. Combustion engine as claimed in claim 1, characterized in that the control unit is connected to sensors registering the engine load and speed, said control unit determining the supply of water at least in dependence on load and r.p.m.

3. Combustion engine as claimed in claim 2, characterized in that the control unit is connected to a sensor registering the intake air temperature in order to include the temperature as a controlling parameter.

4. Combustion engine as claimed in claim 1, characterized in that the control unit is connected to a knock sensor for including the knock signal as a controlling parameter.

5. Combustion engine as claimed in claim 1, characterized in that each injection valve is directed so that the main portion of the water jet is injected straight through the inlet port.

6. Combustion engine as claimed in claim 1, characterized in that each cylinder is provided with a water injection valve and a fuel injection valve, of which valves the former one is situated closer to the inlet port than is the latter one.

7. Combustion engine as claimed in claim 1, characterized in that the control unit is electronically operated and includes a microprocessor in which the values for injection time and quantity of water are stored as functions of load and r.p.m.

* * * * *